(12) United States Patent
Foster et al.

(10) Patent No.: US 10,394,238 B2
(45) Date of Patent: Aug. 27, 2019

(54) MULTI-MODE MISSION PLANNING AND OPTIMIZATION FOR AUTONOMOUS AGRICULTURAL VEHICLES

(71) Applicants: CNH Industrial America LLC, New Holland, PA (US); Autonomous Solutions, Inc., Mendon, UT (US)

(72) Inventors: Christopher A. Foster, Mohnton, PA (US); Nathan Eric Bunderson, Providence, UT (US); Daniel John Morwood, Petersboro, UT (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 190 days.

(21) Appl. No.: 15/400,441

(22) Filed: Jan. 6, 2017

(65) Prior Publication Data
US 2017/0192431 A1    Jul. 6, 2017

Related U.S. Application Data

(60) Provisional application No. 62/275,569, filed on Jan. 6, 2016.

(51) Int. Cl.
*A01B 79/00*   (2006.01)
*G05D 1/00*   (2006.01)
(Continued)

(52) U.S. Cl.
CPC ......... *G05D 1/0088* (2013.01); *A01B 79/005* (2013.01); *G05D 1/0212* (2013.01);
(Continued)

(58) Field of Classification Search
CPC ............ G01C 21/3453; G05D 1/0274; G05D 1/0088; G05D 1/0212; G05D 1/0217;
(Continued)

(56) References Cited

U.S. PATENT DOCUMENTS 7,010,425 B2   3/2006   Gray et al.
7,689,356 B2   3/2010   Dix et al.
(Continued)

FOREIGN PATENT DOCUMENTS

WO    2013160195    10/2013

OTHER PUBLICATIONS

Bochtis et al., "A Mission Planner for an Autonomous Tractor," Sep. 2009, pp. 1429-1440, vol. 52, Issue 5, Transactions of the ASABE.
(Continued)

*Primary Examiner* — Anshul Sood
(74) *Attorney, Agent, or Firm* — Rebecca L. Henkel; Rickard K. DeMille

(57) ABSTRACT

In one embodiment, a method for controlling one or more autonomous agricultural vehicles includes generating a number of mission plans for the one or more autonomous agricultural vehicles, determining a plan value for each of the number of mission plans, selecting a mission plan with the highest plan value, and executing the selected mission plan to control the one or more autonomous agricultural vehicles.

19 Claims, 8 Drawing Sheets

(51) Int. Cl.
 *G05D 1/02* (2006.01)
 *A01B 69/04* (2006.01)
(52) U.S. Cl.
 CPC ......... *G05D 1/0217* (2013.01); *G05D 1/0297* (2013.01); *A01B 69/008* (2013.01); *G05D 2201/0201* (2013.01)
(58) Field of Classification Search
 CPC .......... G05D 1/0297; G05D 2201/0201; A01B 69/008; A01B 79/005
 See application file for complete search history.

(56) References Cited

U.S. PATENT DOCUMENTS

| | | | |
|---|---|---|---|
| 7,756,615 | B2 | 7/2010 | Barfoot et al. |
| 7,765,780 | B2 | 8/2010 | Koselka et al. |
| 7,974,774 | B2 | 7/2011 | Kumar |
| 2006/0095171 | A1 | 5/2006 | Whittaker et al. |
| 2007/0179685 | A1 | 8/2007 | Milam et al. |
| 2010/0299016 | A1 | 11/2010 | Benzler et al. |
| 2011/0029235 | A1 | 2/2011 | Berry |
| 2013/0024060 | A1 | 1/2013 | Sukkarié et al. |
| 2013/0184901 | A1 | 7/2013 | Wall et al. |
| 2013/0325306 | A1 | 12/2013 | Caveney et al. |
| 2015/0232097 | A1* | 8/2015 | Luther .................... B61L 3/006 701/123 |
| 2016/0091898 | A1* | 3/2016 | Booher ................ G05D 1/0274 701/26 |
| 2017/0090478 | A1* | 3/2017 | Blayvas ............. G01C 21/3453 |
| 2017/0192437 | A1* | 7/2017 | Bier ..................... G05D 1/0038 |

OTHER PUBLICATIONS

Hameed et al., "Driving Angle and Track Sequence Optimization for Operational Path Planning Using Genetic Algorithms," 2011, pp. 1077-1086, vol. 27(6), Applied Engineering in Agriculture, American Society of Agricultural and Biological Engineers ISSN 0883-8542.

Gutman et al., "Optimal Working Time Distribution and Routing for Autonomous Tractors Based on Heuristic Algorithms," Jan. 23, 2013, pp. 1486-1493, vol. 74, No. 9, Pleiades Publishing, Ltd., Automation and Remote Control, ISSN 0005-1179.

Anderson "Agricultural Drones," May/Jun. 2014, pp. 56-60, Technology Review, Inc. Cambridge.

* cited by examiner

MULTI-MODE MISSION PLANNING AND OPTIMIZATION FOR AUTONOMOUS AGRICULTURAL VEHICLES

CROSS-REFERENCE TO RELATED APPLICATION

This application claims priority from and the benefit of U.S. Provisional Application Ser. No. 62/275,569, entitled "MULTI-MODE MISSION PLANNING AND OPTIMIZATION FOR AUTONOMOUS AGRICULTURAL VEHICLES," filed Jan. 6, 2016, which is hereby incorporated by reference in its entirety.

BACKGROUND

The present application relates generally to autonomous agricultural vehicles, and more specifically, to systems and methods for multi-mode mission planning and optimization for autonomous agricultural vehicles.

Generally, in autonomous agricultural systems, a base station may control one or more agricultural vehicles working within a field. When a job is requested to be performed in the field, a controller of the base station may determine a mission plan that controls certain functions and movements of the agricultural vehicles available in the field. The mission plan may account for basic constraints, such as number of agricultural vehicles available, type of vehicles available, type of job to perform, size of the field, and so forth. However, in some instances, certain events and/or obstacles may arise while the agricultural vehicles are executing the mission plan. The events and/or obstacles may include a storm arising, one of a number of vehicles working the field becoming inoperable, encountering an unexpected obstacle or features, and the like. Such events and/or obstacles may affect the efficiency of the mission plan, among other things, if not accounted for. Also, the mission plan may be generated and implemented quickly so that the agricultural vehicles can begin working as soon as possible. As a result, the plan may lack certain considerations, such as efficiency.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In one embodiment, a tangible, non-transitory computer readable medium stores computer instructions that, when executed by a processor, generate a first mission plan based on inputs. The first mission plan includes at least a route and a driving speed for at least one agricultural vehicle to initially execute at a beginning of an operation. The computer instructions, when executed by the processor, also generate a second mission plan at least when one or more of the inputs change in response to one or more events that occur during the operation. The second mission plan includes at least one modification to the first mission plan. The computer instructions, when executed by the processor, also generate a third mission plan including at least one modification to the first mission plan or the second mission plan via one or more optimization techniques that reduce a cost function having adjustable weight factors, determine respective plan values for the first, second, and third mission plans, select the first, second, or third mission plan based on the respective plan values, and output the selected mission plan to the at least one agricultural vehicle for execution.

In one embodiment, a system for controlling at least one autonomous agricultural vehicle includes a controller that executes a mission planning and optimization system (MPOS). The MPOS includes a general planner to generate a first mission plan based at least in part on inputs to be initially executed by the at least one autonomous agricultural vehicle at a beginning of an operation on a field, a reactive planner configured to generate a second mission plan when at least one or more of the inputs change in response to one or more events that occur during the operation. The second mission plan includes at least one modification to the first mission plan. The MPOS also includes an optimizing planner configured to generate a third mission plan concurrently with the first mission plan, the second mission plan, or a combination thereof. The third mission plan includes at least one modification to the first mission plan or the second mission plan via one or more optimization techniques that reduce a cost function having adjustable weight factors. The MPOS also includes a mission planning arbitrator that receives the first, second, and third mission plans, determines respective plan values for the first, second, and third mission plans, selects the first, second, or third mission plan based on the respective plan values, and outputs the selected mission plan to the at least one agricultural vehicle for execution.

In one embodiment, a method for controlling one or more autonomous agricultural vehicles includes generating a number of mission plans for the one or more autonomous agricultural vehicles, determining a plan value for each of the number of mission plans, selecting a mission plan with the highest plan value, and executing the selected mission plan to control the one or more autonomous agricultural vehicles.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
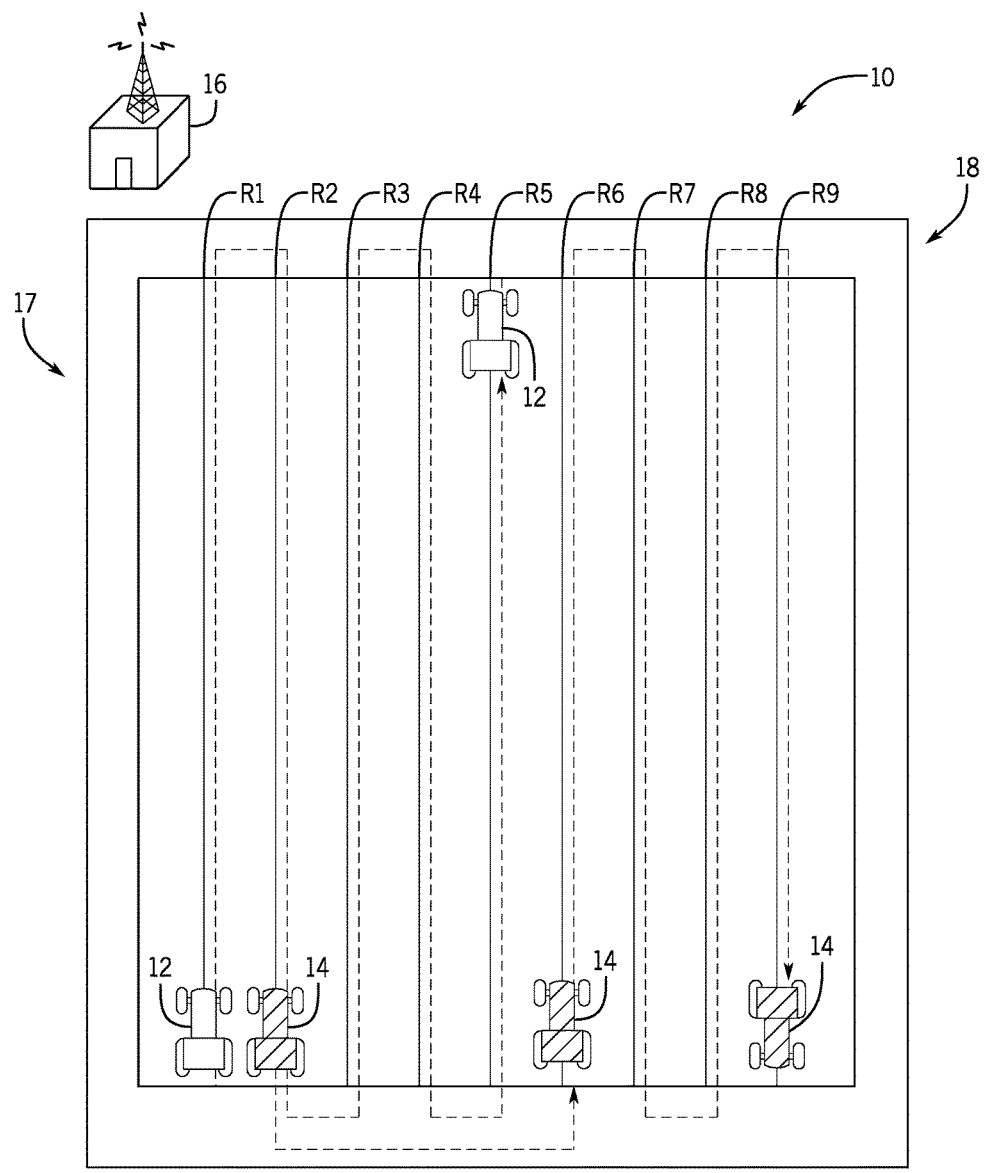
FIG. 1 is a top view of an embodiment of an autonomous agricultural system including agricultural vehicles and a base station, in which the agricultural vehicles are executing a general mission plan provided by the base station.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As may be appreciated, "autonomous" agricultural vehicle may refer the vehicle's ability to operate independently of human input.

Certain autonomous agricultural systems may include a base station that controls one or more autonomous agricultural vehicles (referred to as "vehicles" herein), such as tractors, seeders, harvesters, implements, and the like, based on a mission plan. The mission plan oftentimes is generated by a controller of the base station. The controller may consider some basic constraints when generating the mission plan. However, the controller does not typically offer optimization and/or account for variations to the general mission plan, which is desired.

Accordingly, the present disclosure relates to an autonomous agricultural system that employs a mission planning and optimization system (MPOS). The MPOS includes four components: a mission planning arbitrator, a general planner, a reactive planner, and an optimization planner. The disclosed architecture of the MPOS enables multiple planning components to operate concurrently and interact with one another. When a request for new work is received, the general planner generates a general mission plan quickly for prompt implementation. While the vehicles are executing the general mission plan, the optimization planner may be running in the background, optimizing the current mission plan based on desired user constraints (e.g., cost, time, efficiency) using a cost function. As may be appreciated, a low cost value output by the cost function may indicate a good mission plan. It should be understood that "optimizing" and "optimization" of a mission plan may refer to generating a better mission plan and not necessarily the best mission plan. Also, if any changes to the inputs arise (e.g., number of vehicles available, field conditions, obstacle detected) during mission plan execution, the reactive planner may incorporate the changes into the current mission plan, or recall the general planner. Also, in some embodiments, if any changes to the inputs arise, the optimization planner may be restarted with the updated inputs. As each of the planners generates mission plans, the mission plans are provided to the mission planning arbitrator, which determines a plan value (e.g., numerical rating) for each of the mission plans. It should be noted that the plan value is different than the cost value output by the cost function. For example, a high plan value indicates a good mission plan, whereas a low cost value also indicates a good mission plan. Thus, an optimized mission plan that results in a low cost value may be assigned a high plan value by the mission planning arbitrator. Based on the determined plan values, the mission planning arbitrator may determine the course of action for each mission (e.g., implement new mission plan, adjust current mission plan, discard new mission plan) with or without human interaction.

With the foregoing in mind, FIG. 1 is a top view of an embodiment of an autonomous agricultural system 10 including vehicles 12, 14 and a base station 16, in which the vehicles 12, 14 are executing a general mission plan 17 provided by the base station 16. The MPOS, which may be part of a controller at the base station 16, generates the general mission plan 17 in response to a request to perform work on a field 18. In some embodiments, the MPOS or portions of the MPOS may be part of a controller of the vehicles 12, 14. As illustrated, the field 18 includes nine rows (R1-R9). A first vehicle 12 is aligned with row R1 and a second vehicle 14 is aligned with row R2 and adjacent to the first vehicle 12. The general mission plan 17 is generated relatively quickly (e.g., quicker than the optimized mission plan) and may not consider certain constraints, as discussed in detail below. However, the controller of the base station 16 may determine which agricultural vehicles 12 and 14 are available to perform the task/operation and the position of the agricultural vehicles 12 and 14, and proceed to plan the paths of the agricultural vehicles 12 and 14 by assigning the first agricultural vehicle 12 to traverse rows R1-R5 and the second agricultural vehicle 14 to rows R6-R9, for example. As depicted, the general mission plan 17 that is generated causes the second agricultural vehicle 14 to drive from row R2 to row R6 through the headlands before traversing the assigned rows.

Figure 2:
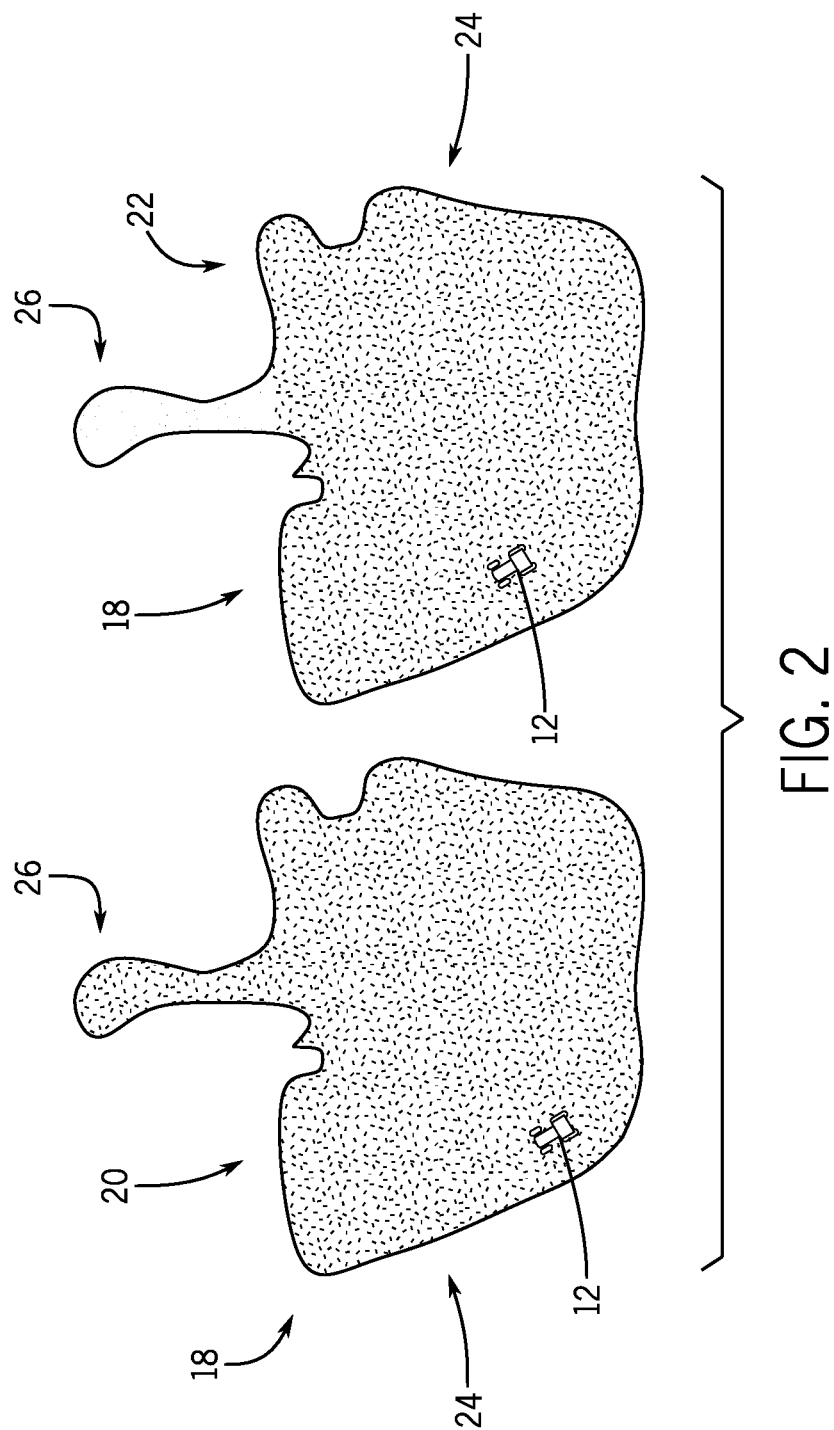
FIG. 2 is a top view of an embodiment of an optimized mission plan weighted for more complete coverage of the field and an optimized mission plan weighted for faster completion time.

FIG. 2 is a top view of an embodiment of an optimized mission plan 20 weighted for more complete coverage of the field 18 and an optimized mission plan 22 weighted for faster completion time. The two optimized mission plans 20 and 22 may be generated by the controller of the base station 16. The field entry/exit points of the first optimized mission plan 20 may be a factor considered by a cost function used by an optimizing planner, and the time to completion may also be a factor considered by the cost function used by the optimizing planner, as described in detail below. The cost function may take the form of a weighted multi-variable function that outputs a scalar. The variables may be the factors described herein. In some embodiments, the mission plan that generates the lowest value (e.g., minimizes) for the scalar (e.g., lowest cost) is the most desirable. Focusing on the first optimized mission plan 20, the controller may have generated the mission plan 20 to cover a high percentage of the field 18 because the field entry/exit points factor was weighted more heavily than some of the other factors considered by the cost function. As such, the optimized mission plan 20 establishes a path for the agricultural vehicle 12 that covers a substantial portion of field 18, including a body 24 and a protruding portion 26. Once the optimized mission plan 20 is generated, it may be output to the agricultural vehicle 12 to be executed.

On the other hand, the second optimized mission plan 22 represents a plan generated by the controller of the base station 16 by weighting the time to completion factor of the cost function more heavily. In some instances, the time to completion factor may be weighted more heavily when it is desirable to cover a high percentage of the field 18 in a set amount of time (e.g., to finish before a storm arrives). As such, the optimized mission plan 22 covers the largest portion of the field 18 (e.g., the body 24) and bypasses the protruding portion 26 of the field 18 because the protruding portion 26 includes many turns and shorter segments, which may be time consuming for the agricultural vehicle 12 to traverse. The protruding portion 26 may be covered in a subsequent mission plan after the larger area is covered that has less turns.

It should be appreciated that many different optimized mission plans may be generated by the controller of the base station as the controller establishes mission plans that minimize a cost function based on certain factors that may be modified by the user. For example, other factors that may cause different optimized mission plans to be generated may include fuel cost, total harvest volume, operation/task efficiency, task precision, and so forth. It should be understood that some of the optimized mission plans may take an extended period of time for the controller to converge on a solution due to complex and/or time consuming calculations. Thus, the controller of the base station 16 may execute an optimizing planner that is decoupled from various other planners so the controller may modify the mission plan (e.g., the general mission plan) without waiting for the optimizing planner to converge on a solution. Further, the substantially optimized solution may take a long time to converge (e.g., for large fields) so intermediate solutions can be determined by the controller and initiated while the optimization is searching for the substantially more optimized solution. In addition, the optimization process may be run offline for a variety of weightings on the cost function. In other words, the optimization process may run while the vehicle 12 is not operating in the field 18 (e.g., during a planning phase, or overnight prior to field operations beginning), and the substantially optimized mission plan that is generated offline may be implemented by the controller 42 when the vehicle 12 is placed in service.

Figure 3:
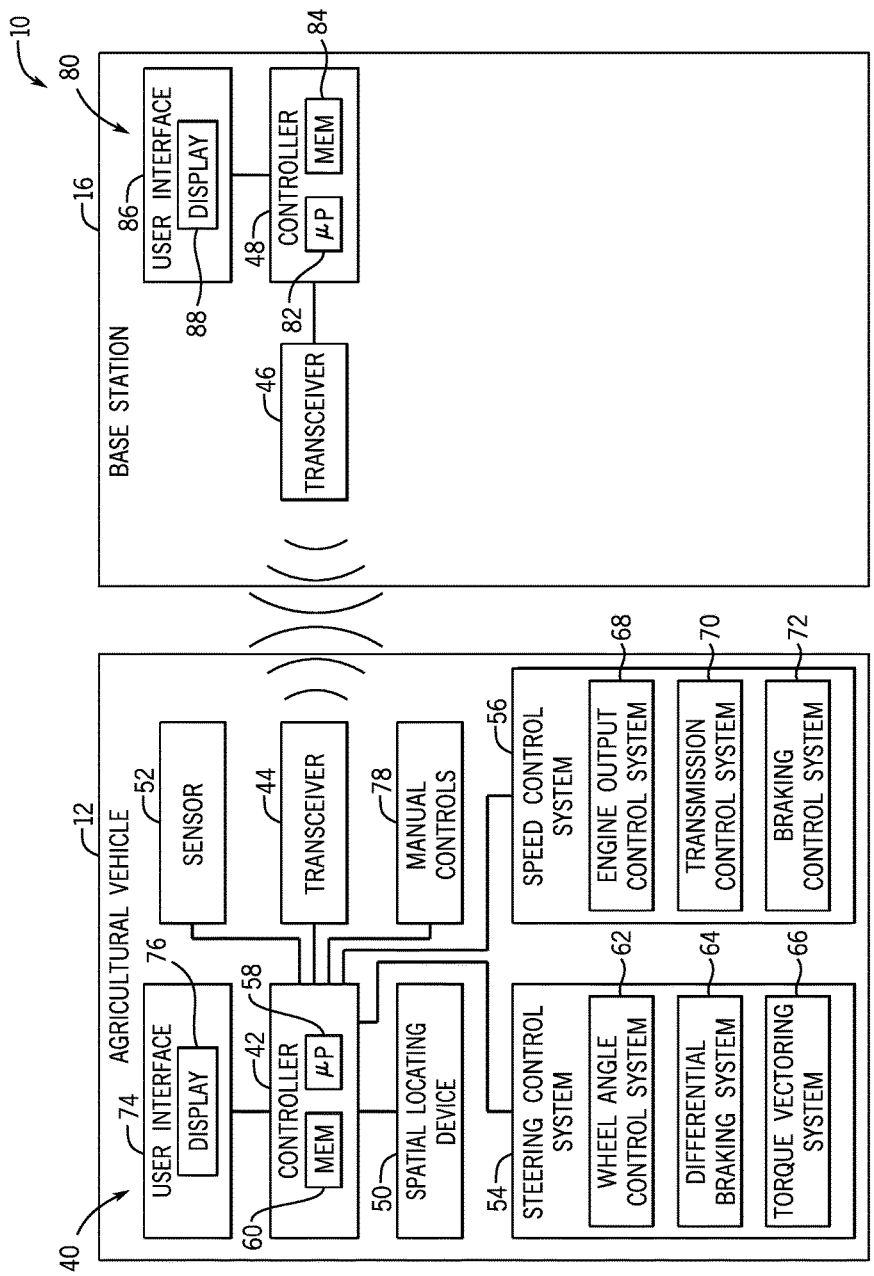
FIG. 3 is a schematic diagram of an embodiment of an agricultural vehicle and a base station, which may be employed within the autonomous agricultural system of FIG. 1.

FIG. 3 is a schematic diagram of an embodiment of the vehicle 12 and the base station 16, which may be employed within the autonomous agricultural system 10 of FIG. 1. In the illustrated embodiment, the vehicle 12 includes a control system 40 having a controller 42 coupled to a first transceiver 44. The first transceiver 44 is configured to send signals to and receive signals from a second transceiver 46 of the base station 16. The second transceiver 46 is communicatively coupled to a controller 48 of the base station 16. As discussed in detail below, the signals sent from the first transceiver 44 to the second transceiver 46 may indicate acceleration of the vehicle 12, velocity of the vehicle 12, position of the vehicle 12, and so forth. Also, the signals received by the first transceiver 44 from the second transceiver 46 may indicate a target velocity of the vehicle 12, a route for the vehicle 12, angle of wheels of the vehicle 12, operation of various components of the vehicle 12 and/or an implement towed by the vehicle 12 (e.g., start seeding, stop seeding, start tilling, stop tilling), and the like.

As will be appreciated, the first and second transceivers 44, 46 may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol.

As used herein, "position" (e.g., determined position, target position, etc.) refers to a position vector, such as a one, two, or three-dimensional position vector. For example, a two-dimensional position vector may include latitude and longitude, and a three-dimensional position vector may include latitude, longitude, and altitude/elevation. As will be appreciated, the position vector may be represented in a rectangular, polar, cylindrical, or spherical coordinate system, among other suitable coordinate systems. In addition, as used herein, "velocity" (e.g., determined velocity, target velocity, etc.) refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. The velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

The vehicle control system 40 also includes a spatial locating device 50, which is mounted to the vehicle 12 and configured to determine a position of the vehicle 12, a velocity of the vehicle 12, and/or a position of the spatial locating device. The spatial locating device 50 is also communicatively coupled to the controller 42. As will be appreciated, the spatial locating device 50 may include any suitable system configured to determine the position and velocity of the vehicle 12, such as a global positioning system (GPS), a global navigation satellite system (GNSS), and the like. In certain embodiments, the spatial locating device 50 may be configured to determine the position and velocity of the vehicle 12 relative to a fixed point within a field (e.g., via a fixed radio transceiver). Accordingly, the spatial locating device 50 may be configured to determine the position and velocity of the vehicle 12 relative to a fixed global coordinate system (e.g., via the GPS) or a fixed local coordinate system.

The first transceiver 44 broadcasts the determined position of the vehicle 12, velocity of the vehicle 12, and/or position of the spatial locating device 50 to the second transceiver 46. In some embodiments, the second transceiver 46 may send the determined positions and/or velocity to the controller 48, which may use the determined position of the vehicle 12 to determine the direction to direct the vehicle 12 (e.g., at the initiation of a route associated with a mission plan). Further, the controller 48 may use the determined velocity of the vehicle 12, proximity to the obstacles, and/or size of approaching obstacles to control the vehicle's velocity (e.g., when the vehicle 12 is near an obstacle).

In addition, the vehicle control system 40 includes one or more sensors 52. The sensors 52 may include an orientation sensor, accelerometer, optical sensor, radio-frequency (RF) sensor, ultrasonic sensor, inductive sensor, infrared sensor, and so forth. In embodiments in which the sensors 52 include an orientation sensor, the orientation sensor is configured to determine a pitch angle, a yaw angle, and/or a roll angle of the agricultural vehicle. For example, the orientation senor 52 may include a gyroscope or other sensor configured to monitor the orientation (e.g., the roll rate, yaw rate, and pitch rate) of the vehicle 12. In certain embodiments, the orientation sensor 52 is also configured to determine a pitch rate, a yaw rate, and/or a roll rate.

In embodiments in which the sensor 52 is an accelerometer, the accelerometer may measure acceleration (e.g., three-dimensional acceleration) of the vehicle 12. That is, the accelerometer may measure movement and/or vibrations while the vehicle 12 is operating and continuously or periodically transmit the obtained data indicative of movement and/or vibrations to the second transceiver 46 (e.g., via the transceiver 44). The controller 48 may use the data from the accelerometer to adjust a mission plan based on certain detected events. For example, the controller 48 may identify a rut in the field or that an obstacle (e.g., boulder) has been encountered based on the data. In some instances, the controller 48 may determine that the vehicle 12 has a mechanical issue based on the data. The controller 48 is configured to use the reactive planner to account for any changes or exceptions that arise during execution of a mission plan (e.g., change in available resources, new obstacle detected, etc.) by adjusting the mission plan to account for the changes. Further, in some embodiments, the controller 48 is also configured to use the optimization planner to generate an optimized mission plan based on the changes or exceptions that arise during execution of the mission plan. That is, the controller 48 may send the changes or exceptions to the optimization planner so that the optimization process may be restarted to generate an optimized mission plan that accounts for the changes or exceptions.

It should be appreciated that any suitable number of sensors 52 (e.g., 1, 2, 3, 4, 5, 6, 8, 10) may be included on the vehicle 12. For example, multiple sensors 52 may be included on the vehicle 12 (e.g., one on each wheel and/or axle) to output data indicative of acceleration caused by a bump. However, in some embodiments, only a single sensor 52 may be used (e.g., on the axle) to determine the acceleration caused by contacting a rut and/or other obstacle.

Additionally, the sensors 52 may be located at any suitable position on the vehicle. In some embodiments, the location of the sensors 52 may vary based upon the vehicle used. For example, for a seeder with numerous sections, a sensor 52 may be located on each of the sections to enable collection of data on a wide swath of the terrain, and may further enable determination of the shape of each rut and/or other obstacle encountered. The location of the sensors 52 may be based on the number of sensors 52 used. For example, if only one sensor 52 is used, then the sensor 52 may be located at a position on the vehicle 12 that is likely to experience vibrations from a number of different areas of the vehicle 12, such as on the axle.

In the illustrated embodiment, the control system 40 includes an automated steering control system 54 configured to control a direction of movement of the vehicle 12, and an automated speed control system 56 configured to control a speed of the vehicle 12. In addition, the control system 40 includes the controller 42 communicatively coupled to the first transceiver 44, to the spatial locating device 50, to the sensors 52, to the automated steering control system 54, and to the automated speed control system 56. The controller 42 is configured to automatically control the vehicle 12 based at least on a mission plan received from the base station 16 via the transceivers 44, 46.

In certain embodiments, the controller 42 is an electronic controller having electrical circuitry configured to process data from the transceiver 44, the spatial locating device 50, and/or other components of the control system 40. In the illustrated embodiment, the controller 42 includes a processor, such as the illustrated microprocessor 58, and a memory device 60. The controller 42 may also include one or more storage devices and/or other suitable components. The processor 58 may be used to execute software, such as software for controlling the vehicle 12, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as ROM. The memory device 60 may store a variety of information and may be used for various purposes. For example, the memory device 60 may store processor-executable instructions (e.g., firmware or software) for the processor 58 to execute, such as instructions for controlling the vehicle 12. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., vehicle position data, vehicle identification data, etc.), instructions (e.g., software or firmware for controlling the vehicle, etc.), and any other suitable data.

In the illustrated embodiment, the automated steering control system 54 includes a wheel angle control system 62, a differential braking system 64, and a torque vectoring system 66. The wheel angle control system 62 may automatically rotate one or more wheels of the vehicle 12 (e.g., via hydraulic actuators) to steer the vehicle 12 along a desired route. By way of example, the wheel angle control system 62 may rotate front wheels, rear wheels, and/or intermediate wheels of the vehicle, either individually or in groups. It should be noted that the vehicle 12 may include wheels and/or tracks. The differential braking system 64 may independently vary the braking force on each lateral side of the vehicle to direct the vehicle 12 along the desired route. Similarly, the torque vectoring system 66 may differentially apply torque from an engine to specific wheels and/or tracks on the vehicle, thereby directing the vehicle 12 along a desired route. While the illustrated steering control system 54 includes the wheel angle control system 62, the differential braking system 64, and the torque vectoring system 66, it should be appreciated that alternative embodiments may include one or two of these systems, in any suitable combination. Further embodiments may include an automated steering control system 54 having other and/or additional systems to facilitate directing the vehicle 12 along the desired route.

In the illustrated embodiment, the automated speed control system 56 includes an engine output control system 68, a transmission control system 70, and a braking control system 72. The engine output control system 68 is configured to vary the output of the engine to control the speed of the vehicle 12. For example, the engine output control system 68 may vary a throttle setting of the engine, a fuel/air mixture of the engine, a timing of the engine, and/or other suitable engine parameters to control engine output. In addition, the transmission control system 70 may adjust gear selection within a transmission to control the speed of the vehicle 12. Furthermore, the braking control system 72 may adjust braking force, thereby controlling the speed of the vehicle 12. While the illustrated automated speed control system 56 includes the engine output control system 68, the transmission control system 70, and the braking control system 72, it should be appreciated that alternative embodiments may include one or two of these systems, in any suitable combination. Further embodiments may include an automated speed control system 56 having other and/or additional systems to facilitate adjusting the speed of the vehicle 12.

In the illustrated embodiment, the vehicle control system 40 includes a user interface 74 communicatively coupled to the controller 42. The user interface 74 is configured to selectively instruct the controller 42 to automatically control the vehicle 12 based on operator input. In certain embodiments, the user interface 74 includes a display 76 configured to present information to the operator, such as a mission plan generated by the controller 48 and sent via the second transceiver 46 to the first transceiver 44. For example, as the MPOS, which may be an element of the controller 48 or executed by the controller, generates general mission plans, reactive mission plans, and/or optimized mission plans, the display 76 is configured to present the mission plans to the operator for validation. If the operator validates the mission plan displayed, then the mission plan may be incorporated into the existing mission plan or replace the existing mission plan. In some embodiments, the operator instructs the MPOS to focus optimization on a portion of the mission plan that the operator determines is suboptimal. In this scenario, the operator can use the user interface 74 to notify the MPOS that a portion of the mission plan may be enhanced to account for a new obstacle and/or event. In certain embodiments, the operator can manually modify the current mission plan using the user interface 74. In some embodiment, the vehicle 12 may be driverless and the base station operator may control the vehicle 12 by selecting which mission plan to implement.

As illustrated, the vehicle 12 includes manual controls 78 configured to enable an operator to control the vehicle 12 while the automatic control system is disengaged. The manual controls 78 may include manual steering control, manual transmission control, and/or manual braking control, among other controls. In the illustrated embodiment, the manual controls 78 are communicatively coupled to the controller 42. The controller 42 is configured to disengage automatic control of the vehicle 12 upon receiving a signal indicative of manual control of the vehicle 12. Accordingly, if an operator controls the vehicle 12 manually, the automatic control system terminates, thereby restoring control of the vehicle 12 to the operator.

In the illustrated embodiment, the base station 16 includes a control system 80 including the controller 48. Similar to the vehicle controller 42, the base station controller 48 includes a processor, such as the illustrated microprocessor 82, and a memory device 84. The memory device 84 may store computer instructions configured to execute the mission planning and optimization system (MPOS). For example, the memory device 84 may store computer instructions (e.g., software, firmware, etc.) to implement the general planner, the reactive planner, the optimizing planner, and the mission planning arbitrator. The memory device 84 may also store data related to mission plans, a map of the terrain (including boundaries of the field), a landscape of the terrain, location of obstacles, and/or relative sizes of obstacles. Also, the memory device 84 may store data related to the vehicle 12, such as position of the vehicle 12 on the terrain, type of vehicle 12, type of sensors 52 on the vehicle, velocity of the vehicle 12, position of the vehicle 12, and the like. In addition, the memory device 84 may store information related to all of the autonomous and non-autonomous vehicles available within or proximate to the field, including types of vehicles and current state.

The controller 48 is communicatively coupled to the second transceiver 46 and configured to transmit mission planning (e.g., routes, velocities, operations) information to the transceiver 46. For example, the controller 48 may determine a general mission plan that includes the target routes and velocities for the vehicles 12 and 14 based on signals received by the second transceiver 46 from the first transceiver 44 (e.g., that indicate the vehicles' positions on the terrain, proximity to each other, proximity to one or more bumps, the size of the bumps, and/or the current velocities of the vehicles, or a combination thereof). The optimizing planner is configured to operate in the background (e.g., execute concurrently with other processes) after the general mission plan is generated to optimize the general mission plan based on certain user constraints. For example, the optimizing planner is configured to use a cost function with adjustable weight factors including an amount of time to complete the mission, a cost of fuel, a total harvest volume, and/or an operation/task efficiency, among other factors, based on user preference. Further, the reactive planner is configured to adjust or replace the mission plan based on changes in the environment (e.g., new obstacle, new resource available, loss of resource, etc.). To that end, the optimizing planner may be restarted to generate an optimized mission plan that accounts for the changes in the environment when detected. In some embodiments, the changes to the mission plan and/or the optimizations may be automatically implemented or accepted via human interaction.

As such, in the illustrated embodiment, the base station control system 80 includes a user interface 86 configured to receive input from an operator. As illustrated, the user interface 86 is communicatively coupled to the controller 48. The user interface 86 includes a display 88 configured to present information to the operator and/or to receive input from the operator. The display 88 may display the mission plans generated by the MPOS to enable the operator to validate the mission plan and cause the mission plan to be executed by the one or more vehicles. In instances in which the operator does not approve the mission plan, the operator can cause the mission plan to be discarded using the user interface 86. Further, the operator can use the user interface 86 to instruct the optimizing planner of the MPOS 100 to focus on a portion of the mission plan that the operator believes to be suboptimal and/or to manually alter the mission plan.

The controller 48 is also configured to determine steering instructions based at least in part on the determined mission plan (e.g., route and the determined target velocity of the vehicles). In some embodiments, the controller 48 is also configured to determine other vehicle functions, such as raising or lowering an implement, engaging differential locks, engaging four-wheel drive, engaging power take-off, and the like. Once the mission plan is determined, the controller 48 is configured to send signals to the second transceiver 46 to communicate the determined route, steering instructions, target velocity, or a combination thereof to the first transceiver 44 of the vehicle 12. The transceiver 44 is configured to receive the signals and send the signals to the controller 42, which instructs the automated steering control system 54 and the automated speed control system 56 to direct the vehicle 12 along the route using the steering instructions and target velocity. In some embodiments, the controller 48 determines the route and sends the route to the controller 42 via transceivers 46 and 44, and the controller 42 determines the steering instructions and/or target velocity based on the route. In such an embodiment, the controller 42 may instruct the automated steering control system 54 and the automated speed control system 56 to direct the vehicle 12 along the route using the determined steering instructions and target velocity.

For example, a general mission plan may include an initial route for two vehicles 12 and 14. However, as the vehicles are executing the general mission plan, the sensors 52 on the vehicles 12 and 14 may detect a new obstacle to be avoided. In such a case, the reactive planner is configured to change the mission plan to direct the vehicles 12 and 14 around the obstacle. Further, the optimizing planner is configured to optimize the general mission plan and/or the altered mission plan based on user preferences by weighting certain factors of the cost function. That is, if the operator indicates a preference that the mission be completed as quickly as possible (e.g., due to an approaching storm), then the optimizing planner is configured to find a route for the vehicles that completes the mission as quickly as possible by weighting the respective factor of the cost function accordingly. In some embodiments, the optimizing planner is restarted to generate an optimized mission plan that accounts for the changed inputs that triggered the reactive planner and the last weights selected for the factors of the cost function. When the optimizing planner obtains a resulting optimized mission plan, the results are provided to the mission planning arbitrator. Likewise, when the general planner generates the general plan and the reactive planner generates an altered mission plan, the results are all sent to the mission planning arbitrator that is configured to evaluate the mission plans and outputs the selected mission plan, or present a sub-set of mission plan alternatives to the user.

In certain embodiments, the controller 48 is configured to adjust the route of the mission plan based on input from the user interface 86. For example, an operator at the base station may periodically adjust the route of the vehicles 12 and 14 so that the vehicles 12 and 14 avoid a particularly rough area in the field 18. Upon adjustment of the route, the updated route is transmitted to the vehicle control system 40 (e.g., via transceivers 44, 46). Upon receiving the updated route, the vehicle control system 40 uses the automatic steering control system 54 and automatic speed control system 56 to direct the vehicles along the route at the desired velocities. In certain embodiments, operators of the vehicles 12 and 14 may also adjust the route via the user interface 74 and/or manual controls 78.

Figure 4:
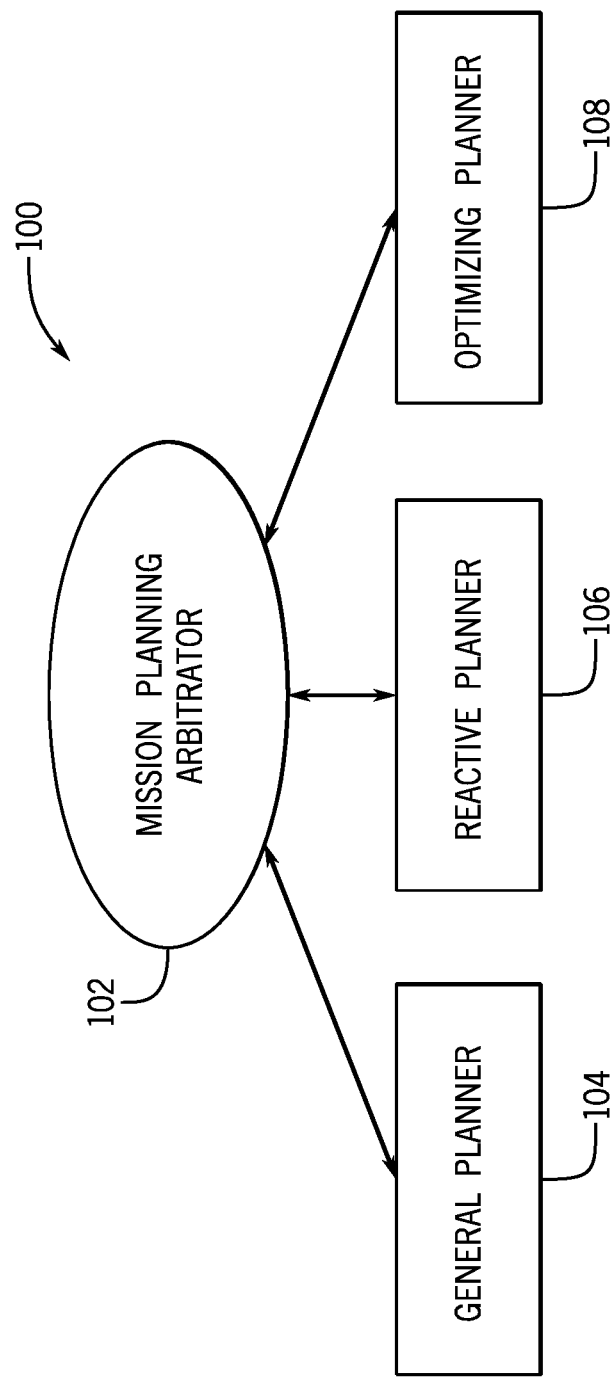
FIG. 4 is a block diagram of a mission planning and optimization system employed within the autonomous agricultural system of FIG. 1.

FIG. 4 is a block diagram of a mission planning and optimization system (MPOS) 100 that may be employed within the autonomous agricultural system 10 of FIG. 1. As previously discussed, the MPOS 100 includes four components: a mission planning arbitrator 102, a general planner 104, a reactive planner 106, and an optimizing planner 108. Each of the components may be implemented via one or more of software, firmware, and hardware. For example, in some embodiments, each component is implemented as computer instructions stored on the memory device 84 of the base station controller 48. In some embodiments, each of the components 102, 104, 106, and 108 may be implemented as software objects or functional modules. It should be understood that each component may include other components. For example, each planner may include any number of suitable planners (e.g., 1, 2, 3, 4, 5). In some embodiments, one planner may perform the functionality of all three of the general planner 104, the reactive planner 106, and the optimizing planner 108. The components 102, 104, 106, and 108 are typically executed online while the agricultural vehicles are performing operations in the field 18. However, it should be understood that the MPOS 100 can run offline and the results can be provided to the agricultural vehicles 12 and 14 when the MPOS 100 is brought online.

The mission planning arbitrator 102 is configured to coordinate the operation of the general planner 104, the reactive planner 106, and the optimizing planner 108, and to select which mission plan to implement, or select a sub-set of mission plans to present to the user. The mission planning arbitrator 102 selects between the mission plans generated by the planners 104, 106, 108 by assigning a plan value to the mission plans and selecting the mission plan with the highest plan value to implement. Based on the plan values, the mission planning arbitrator 102 is configured to implement the selected mission plan by sending the selected mission plan to the agricultural vehicles 12 and 14, adjusting the current mission plan, discarding the new mission plan, and so forth.

When a new request for work is received by the controller 48, the general planner 104 is configured to quickly determine a workable general mission plan so that the vehicles can begin traversing the field 18. In some embodiments, the general planner 104 connects the rows on the terrain to be worked and assigns one or more vehicles to traverse the designated rows. The general planner may generate a general mission plan for the vehicles based on certain input. For example, the vehicles that are assigned may be based on the number of vehicles available, the position of the vehicles, the type of vehicles available, the type of work to be performed, a size of the field 18, the terrain of the field 18, and/or weather condition, among other factors. Once the general planner 104 has generated a general mission plan, the general planner 104 sends the general mission plan to the mission planning arbitrator. In some embodiments, the general planner 104 only executes once at initiation.

The reactive planner 106 is configured to account for changes to the inputs of the general mission plan, an altered mission plan, or an optimized mission plan. As previously discussed, the reactive planner 106 adjusts the current mission plan for unexpected events, such as objects and/or obstacles detected, equipment experiencing a component or sub-system failure, new equipment/vehicle becoming available, and so forth. Thus, if an additional obstacle is detected, then the reactive planner 106 is configured to incorporate associated changes into the current mission plan by, for example, instructing the vehicles in the field to navigate around the obstacle, reduce velocity when driving near and/or over the obstacle, and the like. Likewise, if a new vehicle is added or a vehicle is removed from the available vehicles, then the reactive planner 106 makes changes to the mission plan, or may recall the general planner to make changes to the mission plan to redistribute the work amongst the available vehicles. That is, in some embodiments, the reactive planner 106 may account for local changes to inputs (e.g., such as obstacles detected for by a certain vehicle) and the general planner 104 may account for any larger scale changes (e.g., resource changes, such as vehicles being added or remove). After any changes to the current mission plan are made, the reactive planner 106 is configured to send the reactive mission plan to the mission planning arbitrator 102.

In some embodiments, the optimizing planner 108 is configured to begin optimization of the general mission plan after the general mission plan is provided to the mission planning arbitrator by the general planner 104. The optimizing planner 108 may take a longer time to generate an optimized mission plan than the general planner 104 and the reactive planner 106 due to more computationally intensive, expensive, and advanced operations being performed. In some embodiments, the optimizing planner 108 may perform computations for a certain amount of time before results are available.

The optimizing planner 108 is configured to use a cost function that includes weighted variables, such as a desired time to complete the mission, a cost of fuel, a total harvest volume, a desired operation/task efficiency (e.g., based on harvest losses, accuracy of seed/fertilizer placement, etc.), field entry and exit points, task precision, and so forth. The weights on the variables are set according to user preference. The optimizing planner 108 is configured to solve an optimization problem by finding an optimal solution (e.g., better than the general mission plan and/or the reactive mission plan) that generates the lowest (e.g., reduced) output of the cost function. To achieve this, the optimizing planner 108 is configured to run simulations of different mission plans including changes to path placement (routes), vehicle assignments, vehicle settings, vehicle speeds, and the like, in an attempt to minimize the cost function (e.g., obtain the lowest cost). In some embodiments, when changes to the inputs (e.g., obstacles detected, equipment experiencing an undesired maintenance condition, new equipment/vehicle becoming available, etc.) are detected and the reactive planner 106 is triggered, the optimizing planner 108 may be restarted and provided with the updated inputs so an optimized mission plan is generated that accounts for the new inputs. The optimizing planner 108 uses the weights previously set for the variables in the cost function when generating the optimized mission plan that accounts for the changed inputs.

Once an optimized mission plan or a set of optimized mission plans are generated, the optimized mission plan or plans are sent to the mission planning arbitrator 102. As discussed above, the mission planning arbitrator 102 is configured to assign plan values to the mission plans received by the general planner 104 (e.g., general mission plan), the reactive planner 106 (e.g., reactive mission plan), and the optimizing planner 108 (e.g., optimized mission plan). In some embodiments, the mission planning arbitrator 102 is configured to assign plan values to mission plans. In the event that a mission plan is determined to be of higher value than the current mission plan being executed, the autonomous system 10 is configured to either automatically incorporate the new mission plan, to prompt the operator for validation of the new mission plan and then incorporate/discard the mission plan, or some combination thereof (e.g., operator validates a portion of the mission plan while other portions are automatically included). It should be understood that each mission plan (e.g., general mission plan, reactive mission plan, and the optimized mission plan) may be for numerous vehicles operating in the field.

Figure 5:
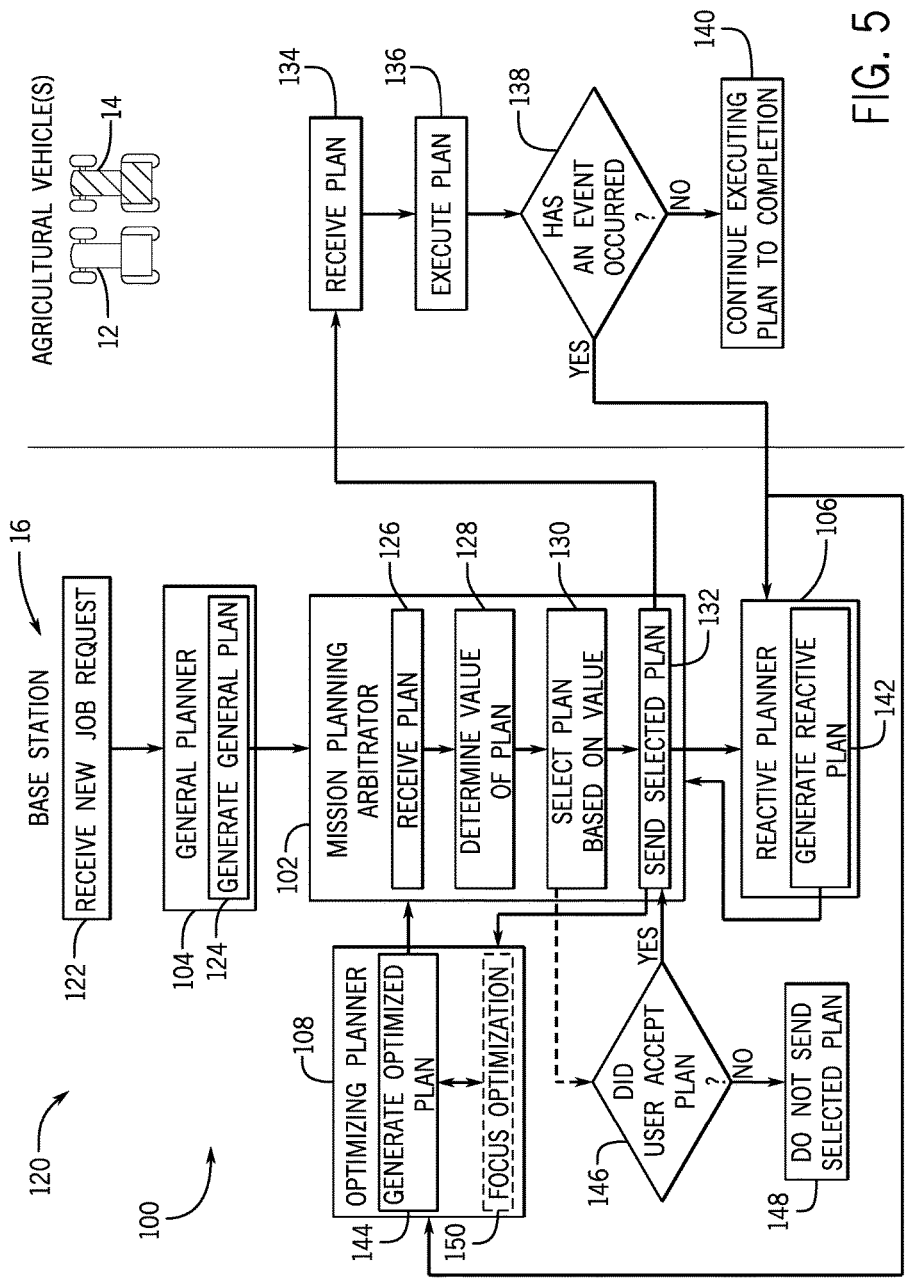
FIG. 5 is a flow diagram of an embodiment of a method for planning and optimizing missions using the mission planning and optimization system of FIG. 4.

FIG. 5 is a flow diagram of an embodiment of a method 120 for planning and optimizing missions using the mission planning and optimization system (MPOS) 100 of FIG. 4. The method 120 may be implemented as computer instructions stored on the memory 84 of the base station 16 and/or the memory 60 of the agricultural vehicles 12 and 14 and executed by the processor 82 of the base station 16 and/or the processor 58 of the agricultural vehicles 12 and 14. It should be noted that some of the steps may not be performed and the steps may be performed in different orders than the order depicted.

The method 120 includes receiving a new job request at the controller 48 of the base station 16 (process block 122). The job request may include delivering an agricultural particulate material to a field, tilling the field, harvesting the field, and so forth. In some embodiments, the job request is entered by an operator using the user interface 86 of the base station 16. Additionally or alternatively, the job request is entered by an operator of the vehicle 12 using the user interface 74, and the job request is sent via the transceivers 44 and 46 to the controller 48 of the base station 16. Also, in some instances, the job request is automatically triggered to execute at a certain date and time by the controller 48 of the base station 16 (e.g., based on a work schedule, weather forecasts, availability of a certain type and/or number of vehicles 12, and so forth).

Once the new job request is received, a general mission plan is generated (process block 124) using the general planner 104. In some embodiments, the general mission plan includes a route for each available vehicle 12. Each route may be based in part on the positions of the vehicles 12 in the field, the type of work to be performed, the type of vehicles 12 available, the size of the field, and so forth. Also, the general mission plan may include a target velocity for each vehicle 12 that performs the mission plan. In some embodiments, the general planner 104 connects the rows of the field in a manner that is easily computed when determining the mission plan. Connecting the rows may refer to linking the ends of the rows together to create a route for the vehicle 12 in a manner that enables the vehicle 12 to traverse every row of the field 18. It should be understood that the general mission plan is generally generated quickly so that the vehicles 12 can begin performing the requested job as soon as possible. As such, in some embodiments, the general planner may not consider certain costs, such as fuel cost, time to completion, soil compaction, field entry/exit points, and so forth, when generating the general mission plan.

The general planner 104 sends the general mission plan to the mission planning arbitrator 102 when the general mission plan is generated. The mission planning arbitrator 102 receives the general mission plan (process block 126) and determines the plan value of the general mission plan (process block 128). The mission planning arbitrator 102 then selects the mission plan to implement based on the determined plan value (process block 130). Since the general mission plan is the only mission plan with a plan value, the mission planning arbitrator 102 selects the general mission plan as the mission plan with the highest plan value and sends the selected general mission plan to the agricultural vehicles 12 and 14 used in the general mission plan (process block 132). Further, the selected general mission plan is also sent to the reactive planner 106, which modifies the mission plan based on changed conditions, as discussed below. And, the selected general mission plan is also sent to the optimizing planner 108, which optimizes the mission plan based on user preferences, as discussed below.

The agricultural vehicles 12 and 14 receive the general mission plan (process block 134) sent via the transceiver 46 of the base station 16 to the transceiver 44 of the respective vehicle. The transceiver 44 sends the received general mission plan to the controller 42, which executes the general mission plan (process block 136) by instructing the automatic steering control system 54 to steer the vehicle and the automatic speed control system 56 to move the vehicle at the desired speed.

During execution of the general mission plan, one or more unexpected events may arise. As such, the agricultural vehicle controller determines whether one such unexpected event has occurred (decision block 138). It should be appreciated, that in some embodiments, the base station controller makes the determination of whether an event has occurred based on data provided by the agricultural vehicle. As discussed above, an unexpected event may include a new obstacle detected based on sensed data, a new vehicle becoming available, a vehicle becoming unavailable due to an undesirable maintenance condition, a change in a weather condition (e.g., rain, wind, thunder), and/or the like.

If an unexpected event does not occur, the current mission plan executes to completion (process block 140). However, if an unexpected event occurs, the reactive planner 106 generates a reactive mission plan (process block 142) and the optimizing planner 108 generates an optimized mission plan (block 144). The reactive planner 106 quickly accounts for the changes in inputs to the mission plan currently executing, and the optimizing planner 108 may restart the optimization process to generate an optimized mission plan that includes the new inputs with the mission plan currently executing. For example, the changes in inputs may include another vehicle becoming available, an existing vehicle becoming unavailable, a storm approaching, a new obstacle detected, and the like. In some embodiments, accounting for the changes may include generating a reactive mission plan that redistributes the work to the newly available vehicles and/or away from the vehicles that have become unavailable, reroutes the vehicles based on a newly detected obstacle and/or a removed obstacle, and so forth.

Once the reactive mission plan is generated, the reactive mission plan is sent to the mission planning arbitrator 102, which may repeat steps 126-132. For example, the mission planning arbitrator 102 receives the reactive mission plan (process block 126) and determines the plan value of the reactive mission plan (process block 128). The mission planning arbitrator 102 may be configured to assign plan values to reactive plans that are higher than general mission plans because the reactive plans account for inputs not available to the general mission planner 104. After plan values are assigned, the mission planning arbitrator 102 selects a mission plan to implement based on the assigned plan values (process block 130). Accordingly, the mission planning arbitrator 102 may select the reactive plan to implement because the reactive mission plan has a higher plan value than the general mission plan previously provided by the general planner 104. However, it should be understood, that if the reactive plan is assigned a plan value lower than the general mission plan, the mission planning arbitrator 102 may not update the mission plan that is currently being executed because the general mission plan is already the mission plan with the highest plan value available. If the mission planning arbitrator 102 selects the reactive plan, then the reactive plan is sent to the agricultural vehicles to be executed (process block 132).

In some embodiments, numerous reactive mission plans may be generated by the reactive planner 106. Each one of the reactive mission plans may alter the route or vehicle speed of one or more of the vehicles 12, 14 in different ways. The numerous reactive mission plans may be presented to the user via the display 88 at the base station 16, and the user may select which reactive mission plan to implement. If a reactive mission plan is selected form the set of reactive mission plans presented to the user, then the selected reactive mission plan is sent to the agricultural vehicles to be executed (process block 132). If the user does not select any of the reactive mission plans, then the current mission plan will continue to be executed.

It should be understood that the optimizing planner 108 concurrently generates one or more optimized mission plans (process block 144) based on a current mission plan (e.g., general mission plan, reactive mission plan) while the current mission plan is being executed by the vehicles 12 and 14. Due to the computationally intensive, expensive, and/or advanced optimizations performed by the optimizing planner 108, results may take a certain amount of time to be generated.

The optimizations performed may use a cost function (e.g., objective function) that includes certain weighted variables related to a time to complete the mission, a cost of fuel, a total harvest volume, an operation/task efficiency, and the like. As previously noted, the weights are configurable based on the user's preference and/or constraints. In some embodiments, the optimization process may be formulated as a "traveling salesman" problem in which there are a given set of inputs, such as rows in a field, lengths of each row, number of vehicles in the field, and so forth, and the optimizing planner 108 uses a suitable technique to determine the optimal solution by reducing the cost function. For example, in some cases, the optimal solution includes the shortest route that covers each row exactly once. To determine the optimized mission plan, the optimizing planner 108 may use a combination of techniques including branch and bound searching, predictive modeling, linear programming, convex optimization, path planning, and/or multi-agent planning. In some embodiments, the optimizing planner 108 attempts to search for a control trajectory including control actions over a control horizon time period that minimizes the cost function. For instance, one or more mathematical models may simulate a surface of the field and generate different mission plans for agricultural vehicles 12 and 14 to execute until an optimized mission plan is found that minimizes the cost function. The mathematical model may use steady-state and/or dynamic equations, linear and/or non-linear equations, differential equations, gain functions, transfer functions, and the like to generate the output used to find the optimized mission plan.

Branch and bound searching may be used to systematically generate candidate mission plans by searching the state space of possible solutions. Searching based on state may include determining a mission plan that extends an initial state to a desired goal state by adhering to the user's preferences. To illustrate, branch and bound searching may include a full set of candidate mission plans at a root of a tree, and the technique may explore branches of the tree by simulating different states at the nodes of the trees. Each branch is checked against upper and lower bounds of the optimal solution using the cost function to determine whether one solution is better than another. For example, certain solutions may cost more than other solutions and be less desirable. Candidate mission plans that cannot produce a better solution (e.g., lower cost) than the best candidate mission plan found by the technique are discarded. As may be appreciated, the number of permutations of candidate mission plans may cause the optimized mission plan to take longer to compute than the general mission plan. The candidate mission plan that generates the lowest cost is selected as the optimal mission plan.

Linear programming may also be used to determine the modifications to the current mission plan based on at least the user preferences. Linear programming is a technique for optimization of a linear cost function (e.g., objective function), which is subject to linear equality and linear inequality constraints. In some embodiments, linear programming may also use the cost function in the computations to find a solution that produces the lowest cost. Linear programming may use a mathematical model in which the constraints and user preferences are represented by linear relationships, and vectors are used for inputs, states, and/or outputs. The output of the model may be one or more points in a generated surface that produce the lowest cost according to the objective function. The points may be used by the optimizing planner 108 to generate the routes and/or speeds for the agricultural vehicles 12 and 14 in the optimized mission planning.

Convex optimization may also be used to determine the modifications to the current mission plan based on at least the user preferences. Convex optimization determines solutions that minimize certain convex functions (e.g., real-valued functions defined on an interval where any two points on a graph of the function lie above the minimum point). Convex functions may be effective for finding the optimized mission path because convex functions include no more than one minimum point. As such, using convex functions to find a point that minimizes a convex objective function may enhance the accuracy of optimized mission plan.

The optimizing planner 108 analyzes the cost of linking nodes via the cost function during simulation of generated mission plans. Indeed, any number of mission plans may be generated and simulated by the optimizing planner 108 until a maximum amount of time has elapsed or no more optimizations are available. To achieve the optimizations, the optimizing planner 108 modifies path placement, vehicle assignments, vehicle settings, vehicle speeds, or some combination thereof. The optimizing planner 108 executes simulation for each optimization. It should be noted that in some embodiments, the optimizing planner 108 may take an extended period of time to converge on a solution, so the optimizing planner 108 may execute in the background.

In some embodiments, when an optimized mission plan is generated, the optimizing planner 108 sends the optimized mission plan to the mission planning arbitrator 102. In some embodiments, the optimizing planner 108 sets a flag that the mission planning arbitrator 102 recognizes as indicating an optimized mission plan is complete and then the mission planning arbitrator 102 retrieves the optimized mission plan, or set of optimized mission plans. In some embodiments, the mission planning arbitrator 102 automatically sends the optimized mission plan to the agricultural vehicles 12 and 14 for execution as soon as the mission planning arbitrator 102 receives the optimized mission plan. In further embodiments, the mission planning arbitrator 102 then executes the steps 126-132. For example, the method 120 may include receiving the optimized mission plan (process block 126) and determining the plan value of the optimized mission plan (process block 128). The mission planning arbitrator may assign a high plan value for the optimized mission plan because the optimized mission plan is tailored to the user preferences and takes into account various costs, as discussed above. The method 120 may then select the mission plan based on plan value (process block 130), which may result in the optimized mission plan being selected due to its high plan value, and the optimized mission may be sent to the agricultural vehicles 12 and 14.

It should be noted that in some embodiments, the mission planning arbitrator 102 may prompt the user to accept the selected mission plan, or select from a sub-set of mission plans, before sending the selected mission plan to the transceiver 44 of the vehicle 12 (decision block 148). If the user accepts the selected mission plan, then the selected mission plan is sent to the agricultural vehicles 12 and 14 (process block 132). If the user does not accept the selected mission plan, then the method 120 does not send the selected mission plan to the transceiver 44 of the vehicle 12 (process block 148).

In some embodiments the optimizing planner 108 includes optional functionality for focusing the optimization (process block 150). Focusing the optimization includes enabling the user to notify the optimizing planner 108 at times when the user determines that a certain part of the planned mission is sub-optimal and/or when the user prefers that a certain part of the mission plan is altered. Focused optimization may include the user intervening and directing the optimizing planner 108 to focus on a particular part of the plan, allowing the user to manually modify the plan, and so forth.

Figure 6:
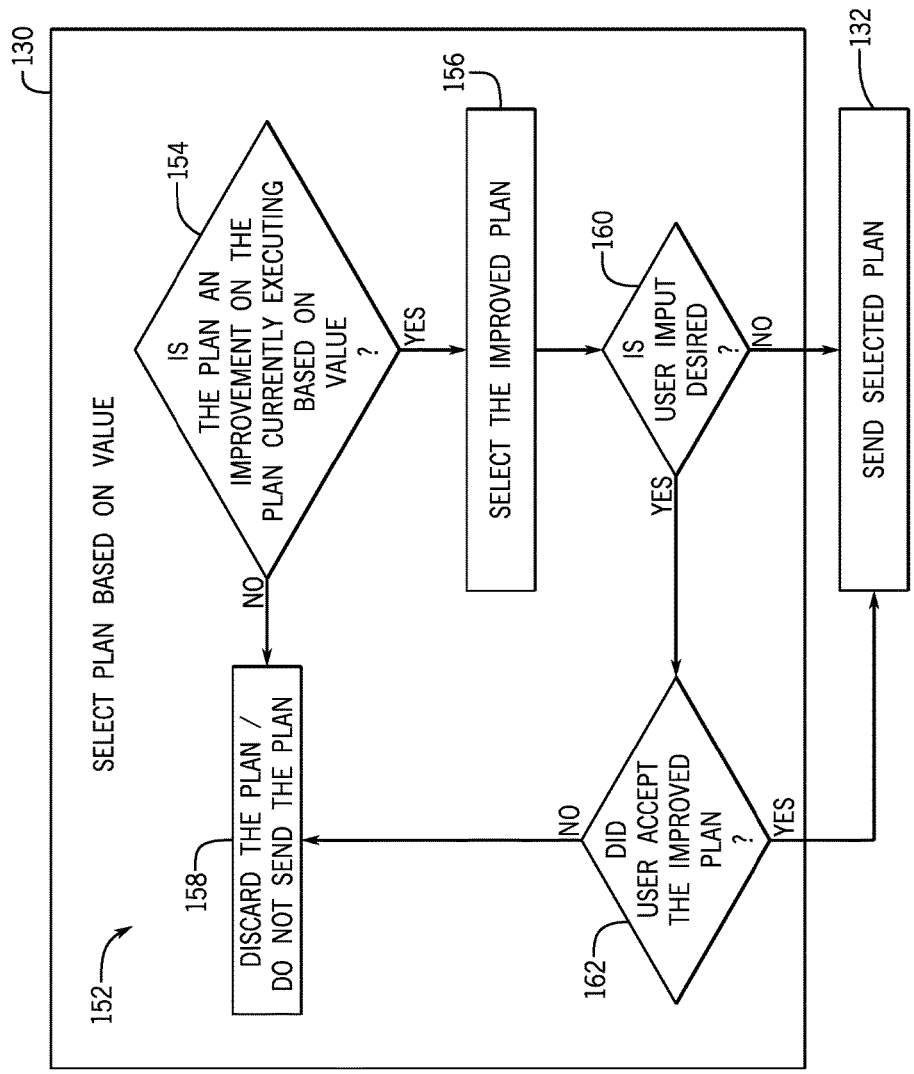
FIG. 6 is a flow diagram of an embodiment of a method for selecting a mission plan based on a determined plan value.

FIG. 6 is a flow diagram of an embodiment of a method 152 for selecting a mission plan based on a determined plan value (e.g., correspond to process block 130 of FIG. 5). The method 152 may be implemented as computer instructions stored on the memory 84 and executed by the processor 82 of the base station 16. In some embodiments, portions of the method 152 may be distributed between the vehicles 12, 14 and the base station 16. That is, portions of the method 152 may be implemented as computer instructions stored on the memory 60 of the vehicle 12, 14 and the memory 84 of the base station 16 and executed by the processor 58 of the vehicles 12, 14 and the processor 82 of the base station 16. The method 152 determines whether the mission plan being analyzed is an improvement on the plan currently being executed based on the plan value of the analyzed mission plan (decision block 154). The analyzed mission plan may include a general mission plan generated by the general planner 104, a reactive mission plan generated by the reactive planner 106 when an event occurs in the field 18 or to the agricultural vehicles 12 and 14, or an optimized mission plan generated by the optimized planner 108.

The plan value of the analyzed mission plan is compared to the currently executing mission plan and, when the plan value of the analyzed mission plan is higher than the plan value of the currently executing mission plan, the analyzed mission plan is selected (process block 156). When the analyzed mission plan is determined to not be an improvement on the currently executing mission plan, the analyzed mission plan is discarded and/or not sent to the agricultural vehicles 12 and 14 (process block 158). If the analyzed mission plan is selected, a determination is made as to whether user input is desired (decision block 160). User input may be desired when the selected mission plan includes significantly different paths for the agricultural vehicles 12 and 14 (e.g., due to the optimizations that account for the various costs and user preferences). When user input is not desired, then the selected plan is sent to the agricultural vehicles 12 and 14 (process block 132). In some embodiments, user input may not be desired when the mission plan is a reactive mission plan, in which it may be desirable to execute the mission plan as soon as possible to avoid newly detected obstacles. When user input is desired, the processor 82 determines whether the user accepted the selected mission plan (decision block 162). If the user accepts the selected mission plan, then the selected mission plan is sent to the agricultural vehicles 12 and 14 (process block 132). If the user does not accept the selected mission plan, then the plan is discarded and/or is not sent to the agricultural vehicles 12 and 14 (process block 158).

Figure 7:
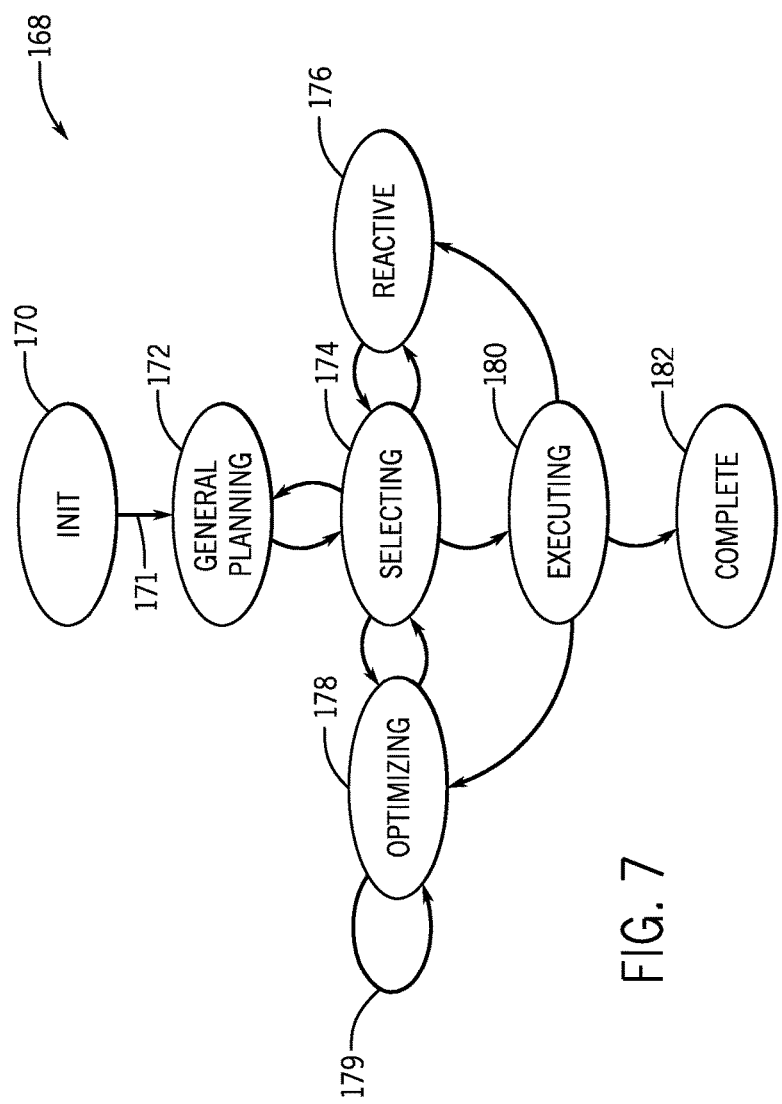
FIG. 7 is a state diagram of an embodiment of a technique for planning and optimizing a mission plan.

FIG. 7 is a state diagram of an embodiment of a technique 168 for planning and optimizing a mission plan for controlling one or more agricultural vehicles 12 and 14. Prior to executing the mission plan, the MPOS 100, which implements the technique 168, is in an initialization state 170. As indicated by the arrow 171, initializing the MPOS 100 transitions the MPOS 100 from the initialization state 170 to a general planning state 172. The MPOS 100 generates a general mission plan in the general planning state 172, as previously discussed. The general mission plan may be quickly generated without considering certain costs and user preferences. Once the general mission plan is generated, the MPOS 100 transitions to a selecting state 174. In the selecting state 174, the MPOS 100 assigns a plan value to all of the mission plans in its possession. Each plan value may be assigned based on various factors, such as mission plan efficiency, portion of the field covered by the mission plan, a fuel cost of the mission plan, and so forth.

The MPOS 100 transitions to a reactive state 176, an optimizing state 178, or an executing state 180 from the selecting state 174. In one scenario, after a mission plan is selected in the selecting state 174, the MPOS 100 sends the mission plan to the agricultural vehicles 12 and 14 and enters the executing state 180. In some scenarios, the MPOS 100 enters the optimizing state 178 from the selecting state 174 to modify the general mission plan to generate an optimized mission plan that accounts for certain costs and user preferences. Further, if there is an obstacle in the field 18 and/or other event detected, then the MPOS 100 transitions to the reactive state 176 from the selecting state 174. In some scenarios, the MPOS 100 focuses the optimization by modifying the mission plan based on user input, and thus the optimization state 178 may be recursively performed as indicated by arrow 179. A reactive mission plan is generated during the reactive state 176. Once the reactive mission plan is generated by the MPOS 100, the MPOS 100 reenters the selecting state 174 to value the reactive mission plan and potentially select a new mission plan, or modify a portion of the mission plan currently being executed. Likewise, when the optimized mission plan is generated, the MPOS 100 enters the selecting 174 to value the optimized mission plan and potentially select the optimized mission plan.

While in the executing state 180, the MPOS 100 may enter the optimizing state 178 to optimize the current mission plan according to costs and/or user preferences, or the MPOS 100 may enter the optimizing state 178 to account for any obstacles or conditions changing in the field 18 during execution. Further, the MPOS 100 may enter the reactive state 176 when an obstacle or a condition changes in the field 18 is detected, or the MPOS 100 may enter a complete state 182 when the mission plan has completed execution. For example, in one scenario, the agricultural vehicles 12 and 14 may encounter a recently developed rut in the field 18 during the executing state 180 and switch to the reactive state 176. In the reactive state 176, the MPOS 100 may determine the location of the new rut in the field 18 and change the paths of the agricultural vehicles 12 and 14 to avoid the rut. Once the reactive mission plan is generated, the MPOS 100 enters the selecting state 174 to select the new reactive mission plan. Once selected, the MPOS 100 switches to the executing state 180 to execute the reactive mission plan. In another example, the MPOS 100 may enter the optimizing state 178 when an obstacle is detected or a condition changes so an optimized mission plan may be generated that accounts for the changed inputs. Once the optimized mission plan that accounts for the new inputs is generated, the MPOS 100 enters the selecting state 174 to select the new optimized mission plan. Once selected, the MPOS 100 switches to the executing state 180 to execute the optimized mission plan. As previously discussed, the optimizing planner 108 may execute concurrently with the other planners and, thus, the MPOS 100 may be in the optimizing state 178 and the reactive state 176 at the same time.

Further, if the user preferences for the mission plan change at any point during the executing state 180, the MPOS 100 transitions to the optimizing state 178 to generate an optimized mission plan, or set of optimized mission plans, that accounts for the new user preferences. Once the optimized mission plan or set of optimized mission plans are generated, the MPOS 100 switches to the selecting state 174 to select an optimized mission plan, and then to the executing state 180 to execute the selected optimized mission plan. It should be noted that the MPOS 100 may be in one or more of the states concurrently. For example, due to the decoupled architecture of the MPOS 100, the MPOS 100 may be in the optimizing state 178 while also in the executing state 180, the selecting state 174, the reactive state 176, and so forth. Concurrent execution of the states enable the optimizing planner 108 to take an extended period of time to perform certain calculations and models, while the MPOS 100 continues to function in other states to control the agricultural vehicles 12 and 14.

Figure 8:
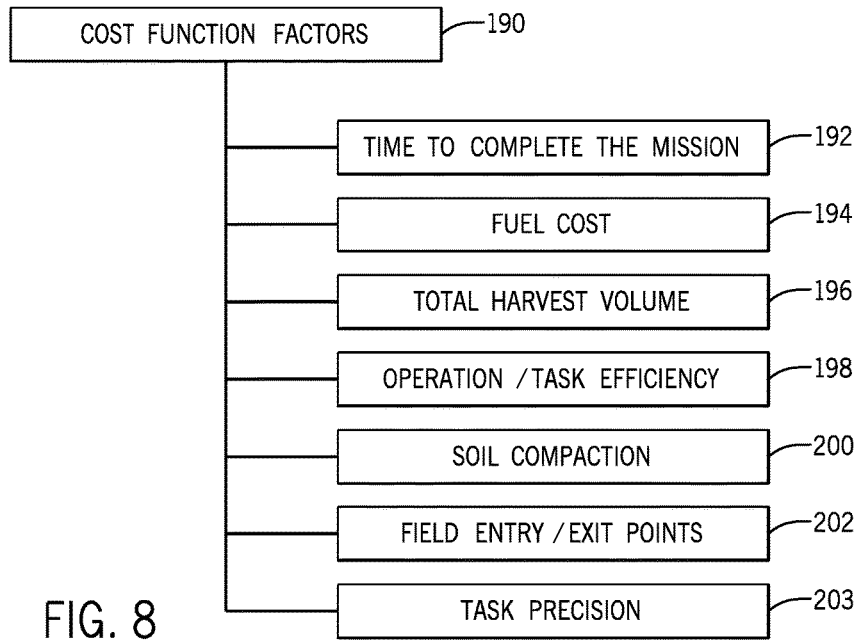
FIG. 8 is a schematic diagram of an embodiment of cost function factors that may be used in the cost function to optimize a mission plan.

FIG. 8 is a schematic diagram of an embodiment of cost function factors 190 used in the cost function to optimize a mission plan. As previously discussed, the cost function factors 190 are tunable by adjusting weights associated with each respective factor. After initiation of the MPOS 100 and the general mission plan is implemented by the agricultural vehicles 12 and 14, the optimization planner 108 may begin modifying the current mission plan to generate an optimized mission plan that reduces the cost function. That is, continuous or near continuous optimization planning may be performed in the background while a mission plan is being executed, and the mission plan may be updated with a portion or portions of the optimized mission plan while the agricultural vehicles 12 and 14 are in operation to reduce the cost function that balances the various cost function factors 190. One benefit of optimizing and/or re-optimizing during operation is that the MPOS 100 may account for changes to the cost function during operation of the vehicles 12 and 14. For example, the user may decide mid-operation that time to complete the mission becomes more important than fuel cost considerations (e.g., due to an impending storm). Further, data gathered during operation of the vehicles 12 and 14 (e.g., fuel usage) may be used to improve the fidelity of the estimated cost function factors 190. Then, the optimization process may be executed that generates an optimal mission plan based on the adjusted factors in the cost function. The optimal mission plan may be selected by the mission planning arbitrator 102 and sent to the vehicles 12 and 14 for execution.

As such, a first factor 192 of the cost function factors 190 is the time to complete the mission. As discussed above, the factor 192 may become more important and, therefore, receive a higher weight than the rest of the factors 190 in various situations, such as when a storm is approaching, and so forth. A second factor 194 of the cost function factors 190 is the fuel cost. For example, fuel cost may be considered more important and weighted more heavily when the cost of the fuel is higher than when it is lower. A third factor 196 is the total harvest volume of the mission plan. When the total harvest volume factor 196 is weighted more heavily than other factors, the optimizing planner 108 may select mission plans that harvest areas of the field where product is more abundant than other areas of the field. In some instances, the selected mission plans may include a higher percentage of field coverage than other mission plans. A fourth factor 198 is the operation/task efficiency of the mission plan. The fourth factor 198 may be weighted more heavily than other factors when increased efficiency of field operations is desired (e.g. performing operations in less time, conserving fuel, harvesting more product, accurately placing seed/fertilizer, reducing harvest losses, etc.). The fifth factor 200 is the soil compaction. During field operations, soil compaction may be weighted heavier so the optimizing planner 108 may generate a mission plan in which the agricultural vehicles 12 and 14 plan a path or paths that will minimize or localize soil compaction. A sixth factor 202 includes the field entry/exit points of the operation. This factor may be weighted more heavily when the user desires that the highest percentage of the field to be worked by considering the field entry/exit points available. this factor may be weighted less heavily when the user desires that portions of the field 18 that have already been seeded or worked are avoided in the mission plan. A seventh factor 203 includes the task precision of the operation. This factor may be weighted more heavily when the user desires that certain tasks are precisely executed. For example, the optimizing planner 108 may generate a mission plan in which the vehicles 12 and 14 reduce speed to improve seed placement and/or spacing based on this factor 203.

Figure 9:
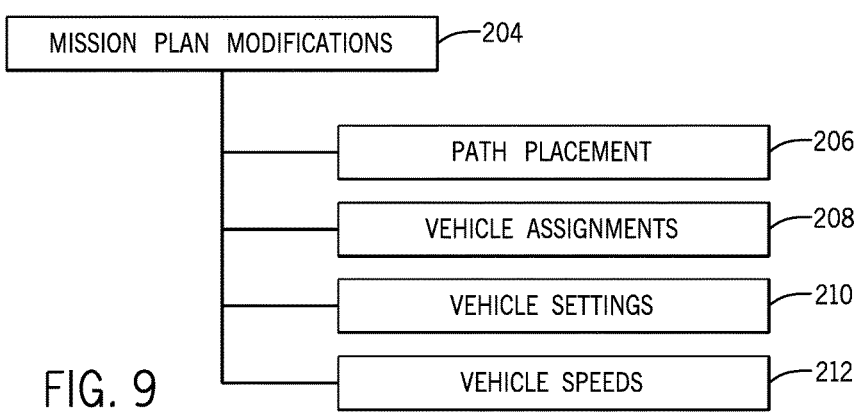
FIG. 9 is a schematic diagram of an embodiment of mission plan modifications used that may be used to generate an optimized/modified mission plan.

FIG. 9 is a schematic diagram of an embodiment of mission plan modifications 204 which may be used to generate an optimized/modified mission plan. The optimizing planner 108 may make one or more of the following modifications 204 when searching for a mission plan that reduces the cost function (e.g., depending on the cost function factors 190). A first mission plan modification 206 is path placement of the agricultural vehicles 12 and 14. For example, when the fuel cost function factor 194 is weighted heavily, the optimizing planner 108 may alter the path placement 206 to find the most fuel efficient path available. A second mission plan modification 208 is vehicle assignments to the mission plan. For example, the optimizing planner 108 may distribute tasks in certain areas of the field to agricultural vehicles 12 and 14 that are located proximate to those particular areas. Further, the optimizing planner 108 may add and/or remove vehicles based on availability. A third mission plan modification 210 is the vehicle settings. The vehicle settings may be modified in certain situations. For example, the vehicle settings may be modified based on soil compaction, terrain type, crop conditions, and so forth. A fourth mission plan modification 212 is the vehicle speed. In some embodiments, the vehicle speed may be increased when the time to complete the mission cost function factor 192 is weighted more heavily, the operation/task efficiency factor 198 is weighted more heavily, and so forth. In addition, the vehicle speed may be reduced to reduce fuel costs. It should be understood that other mission plan modifications 204 are contemplated in other embodiments.

While only certain features of the subject matter have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A tangible, non-transitory computer readable medium storing computer instructions, wherein the computer instructions, when executed by a processor, are configured to:

generate a first mission plan based at least in part on inputs, wherein the first mission plan comprises at least a route and a driving speed for at least one agricultural vehicle to initially execute at a beginning of an operation;

generate a second mission plan at least when one or more of the inputs change in response to one or more events that occur during the operation, wherein the second mission plan comprises at least one modification to the first mission plan;

generate a third mission plan comprising at least one modification to the first mission plan or the second mission plan via one or more optimization techniques that reduce a cost function having adjustable weight factors;

determine respective plan values for the first, second, and third mission plans;

select the first, second, or third mission plan based on the respective plan values; and output the selected mission plan to the at least one agricultural vehicle for execution.

2. The computer readable medium of claim 1, wherein the adjustable weight factors comprise an amount of time to complete the operation, a cost of fuel, a total harvest volume, an efficiency of the operation, soil compaction, field entry/exit points, task precision, or some combination thereof.

3. The computer readable medium of claim 1, wherein the at least one modification comprises a modification to the route, a modification to an assignment of the at least one agricultural vehicle for portions of the operation when the at least one agricultural vehicle comprises a plurality of agricultural vehicles, a modification to one or more settings of the at least one agricultural vehicle, a modification to a speed of the at least one agricultural vehicle, or some combination thereof.

4. The computer readable medium of claim 1, wherein the one or more optimization techniques comprise branch and bound searching, predictive modeling, linear programming, convex optimization, path planning, multi-agent planning, or some combination thereof.

5. The computer readable medium of claim 1, wherein the computer instructions, when executed by the processor, are configured to:

focus the one or more optimization techniques on a selected portion of the third mission plan to enhance the selected portion of the third mission plan based on user input; or modify the third mission plan based on user input.

6. The computer readable medium of claim 1, wherein the one or more events comprise a detected obstacle in a field on which the operation is performed, one of the at least one agricultural vehicle becoming unavailable when the at least one agricultural vehicle comprises a plurality of agricultural vehicles, one of the at least one agricultural vehicle becoming available when the at least one agricultural vehicle comprises a plurality of agricultural vehicles, a change in a weather condition, a detected maintenance condition of the at least one agricultural vehicle, or some combination thereof.

7. The computer readable medium of claim 1, wherein the inputs comprise a number of agricultural vehicles available to perform the operation, a size of the field, a terrain of the field, a position of the at least one agricultural vehicle, a type of the at least one agricultural vehicle available, a type of the operation to be performed, or some combination thereof.

8. The computer readable medium of claim 1, wherein the computer instructions, when executed by the processor, are configured to prompt a user to accept the first, second, or third mission plan before outputting the selected mission plan to the at least one agricultural vehicle.

9. The computer readable medium of claim 1, wherein the instructions, when executed by the processor, are configured to execute a general planner that generates the first mission plan, to execute a reactive planner that generates the second mission plan, and to execute an optimizing planner that generates the third mission plan, and to execute a mission planning arbitrator that determines the plan values and selects between the first, second, and third mission plans.

10. The computer readable medium of claim 9, wherein the computer instructions, when executed by the processor, are configured to execute the optimizing planner concurrently with the reactive planner and the mission planning arbitrator, and to provide the third mission plan to the mission planning arbitrator when the third mission plan is generated.

11. The computer readable medium of claim 9, wherein the mission planning arbitrator is configured to output the second or third mission plan to the at least one agricultural vehicle during the operation.

12. A system for controlling at least one autonomous agricultural vehicle, comprising:
a controller configured to execute a mission planning and optimization system (MPOS), wherein the MPOS comprises:
a general planner configured to generate a first mission plan based at least in part on inputs to be initially executed by the at least one autonomous agricultural vehicle at a beginning of an operation on a field;
a reactive planner configured to generate a second mission plan when at least one or more of the inputs change in response to one or more events that occur during the operation, wherein the second mission plan comprises at least one modification to the first mission plan;
an optimizing planner configured to generate a third mission plan concurrently with the first mission plan, the second mission plan, or a combination thereof, wherein the third mission plan comprises at least one modification to the first mission plan or the second mission plan via one or more optimization techniques that reduce a cost function having adjustable weight factors; and
a mission planning arbitrator configured to:
receive the first, second, and third mission plans;
determine respective plan values for the first, second, and third mission plans;
select the first, second, or third mission plan based on the respective plan values; and
output the selected mission plan to the at least one agricultural vehicle for execution.

13. The system of claim 12, wherein the adjustable weight factors comprise an amount of time to complete the operation, a cost of fuel, a total harvest volume, an efficiency of the operation, soil compaction, field entry/exit points, task precision, or some combination thereof.

14. The system of claim 12, wherein the at least one modification comprises a modification to a route, a modification to an assignment to the at least one agricultural vehicle for portions of the operation, a modification to one or more settings of the at least one agricultural vehicle, a modification to a speed of the at least one agricultural vehicle, or some combination thereof.

15. The system of claim 12, wherein the optimizing planner is configured to restart generation of the third mission plan to account for the at least one or more of the inputs that change in response to one or more events that occur during the operation.

16. The system of claim 12, wherein the optimizing planner is configured to:
focus the one or more optimization techniques on a selected portion of the third mission plan to enhance the selected portion of the third mission plan based on user input; or
modify the third mission plan based on user input.

17. The system of claim 12, wherein the optimizing planner is configured to generate the third mission plan when the at least one autonomous agricultural vehicle is offline.

18. A method for controlling one or more autonomous agricultural vehicles, comprising:
generating a plurality of mission plans for the one or more autonomous agricultural vehicles;
determining a plan value for each of the plurality of mission plans;
selecting a mission plan with the highest plan value; and
executing the selected mission plan to control the one or more autonomous agricultural vehicles;
wherein the plurality of mission plans comprise:
a first mission plan that is based at least in part on inputs and comprises an initial route and speed for the one or more autonomous agricultural vehicles to perform an operation on a field;
a second mission plan that comprises at least one modification to the first mission plan based at least on a change to the inputs; and
a third mission plan that comprises at least one modification to the first mission plan or the second mission plan via one or more optimization techniques that reduce a cost function having adjustable weight factors.

19. The method of claim 18, wherein the second mission plan and the third mission plan are generated after the one or more autonomous agricultural vehicles begin executing the first mission plan.

* * * * *